United States Patent [19]

Foster

[11] Patent Number: 5,501,220

[45] Date of Patent: Mar. 26, 1996

[54] DIGITAL GENERATION OF A DYNAMIC APODIZATION CORRECTION

[75] Inventor: Steven G. Foster, Greenfield, Wis.

[73] Assignee: General Electric Company, Milwaukee, Wis.

[21] Appl. No.: 343,319

[22] Filed: Nov. 22, 1994

[51] Int. Cl.⁶ .................................................. A61B 8/00
[52] U.S. Cl. ................................ 128/661.01; 73/602
[58] Field of Search ................... 128/660.01, 660.04, 128/661.01; 73/602, 609, 626

[56] References Cited

U.S. PATENT DOCUMENTS

| | | | |
|---|---|---|---|
| 4,452,084 | 6/1984 | Taenzer | 73/609 |
| 4,809,184 | 2/1989 | O'Donnell et al. | 128/660.01 |
| 5,345,939 | 9/1994 | Engeler et al. | 128/661.01 |

*Primary Examiner*—George Manuel
*Attorney, Agent, or Firm*—B. Joan Haushalter; John H. Pilarski

[57] ABSTRACT

A dynamic apodization gain correction technique for use with ultrasound imaging systems comprises an apodization curve generator and the ability to drive the curve generator to provide digital generation of the apodization gain correction curve. The ability to drive the curve generator comprises an initial plurality of active elements and data represented by a series of slopes and associated time-dependent break-points.

4 Claims, 1 Drawing Sheet

DIGITAL GENERATION OF A DYNAMIC APODIZATION CORRECTION

TECHNICAL FIELD

The present invention relates to ultrasound imaging and, more particularly, to digital generation of a dynamic apodization correction in ultrasound imaging apparatus.

BACKGROUND ART

Ultrasonic echoes from deliberately launched diagnostic sound waves into tissue are attenuated in proportion to the distance that the sound waves must travel to reach the reflector, plus the distance that the resulting echoes must travel back to reach the receiver. Since sound waves are attenuated as they pass through the human body, the deeper the penetration, the greater the attenuation.

Typically, the aperture of an ultrasonic imaging transducer opens wider as echoes are received from deeper depths. Aperture is defined as the lateral length (the longer dimension of the transducer surface) of the array of elements that are actively receiving.

Existing ultrasound imaging systems limit the ratio of the focus point depth to aperture length (i.e., the F number) to a value such as 2.0 or more. However, at shallow depths, some elements are too far from the focal point to achieve this F number and, hence, must be inactive. More elements turn on as the depth increases, causing the signal strength from the sum of all the active elements to increase. If the increase in signal strength were not compensated, then the image would appear to brighten with increasing depth, forcing the operator to compensate with time gain compensation (TGC). Since it is not desirable to have the operator correct for a system artifact, the correction must be done automatically. TGC is a method of increasing the receiver gain as echoes are received from deeper tissues or equivalently with time. Existing TGC's are analog, since the architecture of existing medical ultrasound systems is analog. However, ultrasound imaging systems are being developed which include digital architecture.

It would be desirable then to have a dynamic apodization correction technique for use with any ultrasound imaging system, including an ultrasound imaging system which incorporates digital architecture, which can maintain constant overall signal strength.

SUMMARY OF THE INVENTION

The present invention provides a dynamic apodization correction means for maintaining constant signal strength in an ultrasound imaging system. As more transducer elements in an ultrasound imaging system are allowed to receive, echo strength increases, necessitating gain reduction. The dynamic apodization correction technique of the present invention maintains the overall signal strength, so the clinician no longer has to manually compensate for the brightness of the image as the image brightness changes, i.e., as the aperture opens. The dynamic apodization technique of the present invention is compatible with the architecture of medical ultrasound imaging systems, including systems which include digital architecture.

In accordance with one aspect of the present invention, a dynamic apodization gain correction technique for use with ultrasound imaging systems comprises an apodization curve generator and a means for driving the curve generator to provide digital generation of the apodization gain correction curve. The means for driving the curve generator comprises an initial plurality of active elements and data represented by a series of slopes and associated time-dependent breakpoints.

Accordingly, it is an object of the present invention to provide an apodization curve generator. It is a further object to provide such a curve generator which is compatible with the architecture of medical ultrasound systems. It is yet another object of the present invention to provide such a curve generator which is compatible with the architecture of systems which incorporate digital architecture.

Other objects and advantages of the invention will be apparent from the following description, the accompanying drawings and the appended claims.

DETAILED DESCRIPTION OF THE INVENTION

Figure 1:
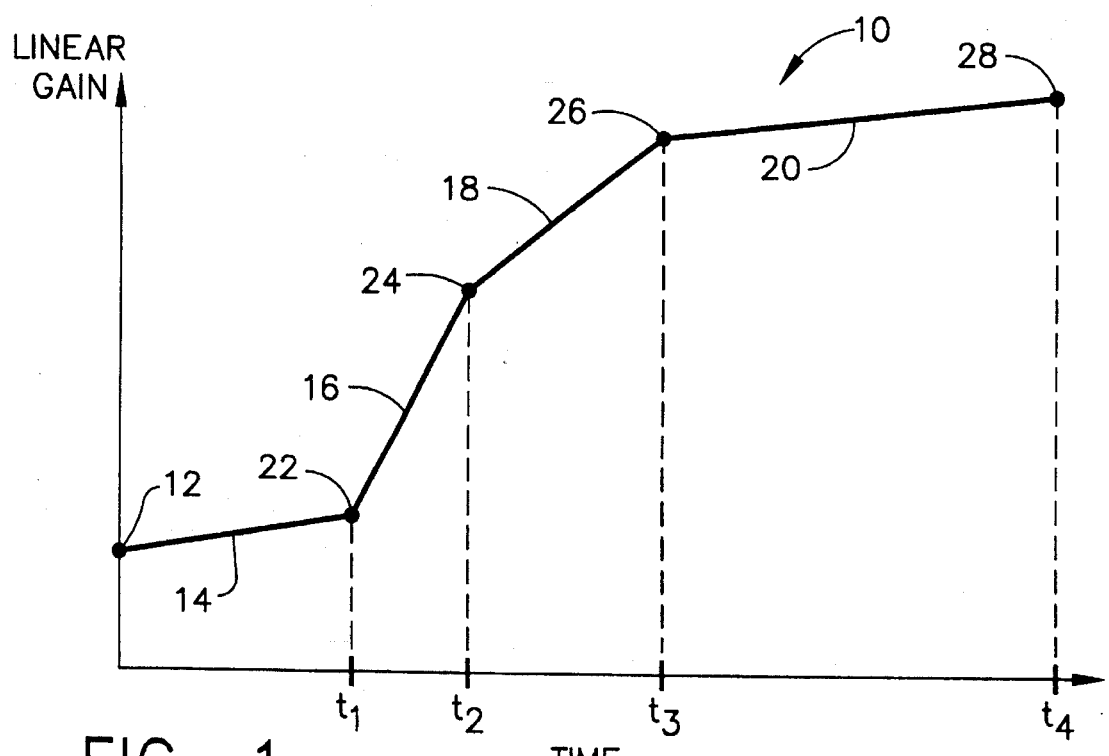
FIG. 1 is a piece-wise, continuous graphical representation of dynamic apodization gain correction, in accordance with the present invention.

Referring to the drawings, a desired dynamic apodization gain correction curve 10 in FIG. 1, is specified by an initial gain 12 followed by data represented by a series of slopes 14, 16, 18, 20 and associated break points 22, 24, 26, 28. Each break point 22, 24, 26, 28 is specified in units of time as $t_1$, $t_2$, $t_3$, $t_4$, respectively, and indicates the image depth at that point in time. The gain is measured linearly, and increases as time (and distance through the body) progresses. The x-axis of the curve 10 represents depth of the vector, or the time it takes from the start of receive to the end of the current depth of the image. The y-axis represents the gain value applied to the receive vector.

The tendency, as seen in FIG. 1, is for the gain to constantly increase. The desired apodization correction is specified as a curve by the initial gain, i.e., the initial number of active elements, followed by the series of pairs consisting of a slope and a break point that approximate the rate that elements turn on. The break point is specified in units of time. The generator starts the curve with the initial gain and then increments the curve by the slope value periodically in time until the first break point is reached. At this point the new slope is loaded and the curve incremented by this new value and so on. The dynamic apodization gain is converted to dB's and is subtracted from the Time Gain Compensation (TGC) curve.

Figure 2:
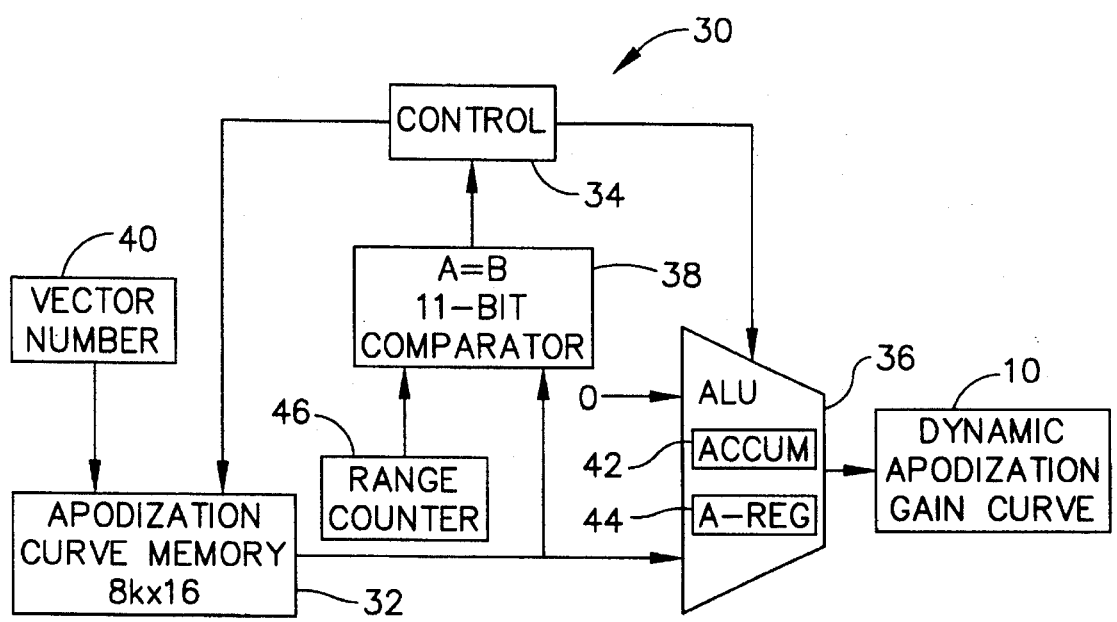
FIG. 2 is a schematic block diagram of a dynamic apodization gain correction curve generator of the present invention for generating the graphical representation illustrated in FIG. 1.

The block diagram of the electronics which generate the dynamic apodization correction curve of FIG. 1 is illustrated in FIG. 2. Generator 30 comprises four functional blocks, including memory block 32, control block 34, arithmetic logic unit (ALU) block 36, and time comparator block 38. The memory block 32 contains a number of coefficients for the gain curves, including the initial gain, the location in time of the break points of the curves, and the slope between break points. The memory block 32 receives a vector number from vector number block 40, to indicate the aim, i.e., straight or angled, which affects the number of elements of the array that are to be turned on to receive. The more area that is receiving, (i.e., the larger the aperture) the more sound is received, and the louder the signal is. The present invention compensates for the varying of the aperture opening.

Continuing with FIG. 2, the memory block 32 also interacts with the control block 34 to receive information such as the varying focal points. The control block 34 performs several functions, in addition to interacting with the memory block, such as timing and coordination of all the elements in the system, including when to start and when to move on to the next step in the process. The control block 34 also interacts with accumulator 42 of ALU block 36, providing instructions to the accumulator 42. The accumulator of the ALU 42 is initialized at the beginning of each dynamic apodization gain curve 10 with the initial gain 12. An A-register 44 associated with the ALU block 36 is loaded with the first slope rate, and the time of the first break point is held on the output of the memory block 32 and is provided to comparator 38.

The control block 34 uses an A=B output from an 11-bit time comparator block 38, associated with a range counter 46, to monitor time coincidence with the preset break point time value. When a coincidence is detected, the next slope is loaded into the A-register 44 and the next break point is addressed and held on the output of the memory block 32, repeating the cycle. The ALU 36 generates the piecewise continuous curve 10 at the rate of 5 MHz by accumulating the slope loaded into the A-register on every clock. The dynamic apodization gain curve is converted into dB by a log ROM (not shown) so that it is compatible with the TGC gain which is also in dB.

In an ultrasound imaging apparatus, the amount of area, or the aperture, receiving signals affects the sound and signal strength. As the aperture opening increases, the image brightness increases. The present invention eliminates the need for the clinician to manually compensate for the image brightness variations by automatically compensating for the aperture opening, thereby maintaining constant signal strength. The present invention compensates for the aperture opening by providing for digital generation of a dynamic apodizationcorrection.

The invention has been described in detail with particular reference to certain preferred embodiments thereof, but it will be understood that modifications and variations can be effected within the spirit and scope of the invention.

We claim:

1. A dynamic apodization gain correction apparatus for use with ultrasound imaging systems comprising:

an apodization curve generator;

a means for driving the curve generator to provide digital generation of the apodization gain correction curve, including an initial gain comprised of an initial plurality of active elements, and data represented by a series of pairs comprising a slope and an associated break point which represent incremental increases in the curve, wherein the initial plurality of active elements comprises a memory means, an arithmetic logic unit including an accumulator and a register, a control means for providing information to the memory means and instructions to the arithmetic logic unit, and a comparator means used by the control means to monitor time coincidence with the time-dependent break-points.

2. A method for maintaining constant signal strength in an ultrasound imaging apparatus comprising the steps of;

providing an apodization curve generator;

providing an initial plurality of active elements;

recognizing data represented by a series of slopes and associated time-dependent break-points; and using the initial plurality of active elements and the data to drive the apodization curve generator and provide digital generation of the apodization gain correction curve.

3. A method for maintaining constant signal strength as claimed in claim 2 wherein the initial plurality of active elements comprises:

memory means;

an arithmetic logic unit;

a control means for providing information to the memory means and instructions to the arithmetic logic unit; and a comparator means used by the control means to monitor time coincidence with the time-dependent break-points.

4. A method for maintaining constant signal strength as claimed in claim 3 wherein the arithmetic logic unit comprises an accumulator and a register.

* * * * *